(12) United States Patent
Yoo et al.

(10) Patent No.: US 8,883,386 B2
(45) Date of Patent: Nov. 11, 2014

(54) POLYESTER RESIN AND TONER INCLUDING SAME

(75) Inventors: Young Man Yoo, Seoul (KR); Kye Yune Lee, Suwon-si (KR); Tae Woong Lee, Suwon-si (KR); Jong Wook Shin, Suwon-si (KR)

(73) Assignee: SK Chemicals Co., Ltd., Gyeonggi-Dong (KR)

( * ) Notice: Subject to any disclaimer, the term of this patent is extended or adjusted under 35 U.S.C. 154(b) by 55 days.

(21) Appl. No.: 13/520,592

(22) PCT Filed: Jan. 6, 2011

(86) PCT No.: PCT/KR2011/000059
§ 371 (c)(1),
(2), (4) Date: Jul. 5, 2012

(87) PCT Pub. No.: WO2011/083969
PCT Pub. Date: Jul. 14, 2011

(65) Prior Publication Data
US 2012/0276479 A1    Nov. 1, 2012

(30) Foreign Application Priority Data

Jan. 8, 2010 (KR) .................. 10-2010-0001790

(51) Int. Cl.
G03G 9/00 (2006.01)
G03G 9/087 (2006.01)
C08G 63/08 (2006.01)
C08G 63/60 (2006.01)

(52) U.S. Cl.
CPC ........ *G03G 9/08755* (2013.01); *G03G 9/08775* (2013.01); *C08G 63/08* (2013.01); *C08G 63/60* (2013.01)
USPC ..................................... 430/109.4; 430/109.1

(58) Field of Classification Search
USPC ............. 430/109.1, 109.4; 525/450; 528/272
See application file for complete search history.

(56) References Cited

U.S. PATENT DOCUMENTS 6,432,600 B2 * 8/2002 Suwa et al. ................ 430/109.1

FOREIGN PATENT DOCUMENTS

| JP | 06-200250 | 7/1994 |
|---|---|---|
| JP | 06308765 | 11/1994 |
| JP | 09-274335 | 10/1997 |
| JP | 2001166537 | 6/2001 |
| JP | 2006096845 | 4/2006 |
| JP | 2006519416 | 8/2006 |
| JP | 2007047764 | 2/2007 |
| JP | 2008-250171 | 10/2008 |
| JP | 2009-075544 | 4/2009 |
| JP | 2009242444 | 10/2009 |
| KR | 0184537 | 4/1999 |
| KR | 20070112855 | 11/2007 |
| WO | 2006102280 A1 | 9/2006 |
| WO | WO2006102280 | 9/2006 |
| WO | 2008031592 A1 | 3/2008 |
| WO | 2009021101 A1 | 2/2009 |

OTHER PUBLICATIONS

Office Action dated Apr. 1, 2013 from the Chinese Patent Office regarding Application No. 201180005425.6.
International Search Report for International Application No. PCT/KR2011/000059 dated Sep. 1, 2011.
Office Action dated Dec. 10, 2013 issued by the Japanese Patent Office regarding Japanese Patent Application No. 2012-547957. (Summary attached).

* cited by examiner

*Primary Examiner* — Thorl Chea
(74) *Attorney, Agent, or Firm* — Abelman, Frayne & Schwab

(57) ABSTRACT

Disclosed herein is a toner for use in an electronic photograph-duplicating process or in an electrostatic printing process, and a polyester resin included in the toner as a binder. The polyester resin comprises lactic acids (D or L-lactic acids) or lactides (D or L-lactides) which are derivative compounds thereof, and dianhydrohexitols which are bio-derived sugar derivatives.

3 Claims, No Drawings

POLYESTER RESIN AND TONER INCLUDING SAME

CROSS-REFERNCE TO RELATED APPLICATIONS:

This application is a §371 National of PCT/KR2011/000059, filed 6 Jan. 2011, which claims priority from Korean Application No. 10-2010-0001790, filed 8 Jan. 2010, the discloser of which are incorporated herein by reference.

TECHNICAL FIELD

The present invention relates to a polyester resin and a toner including the same, and, more particularly, to a toner used in an electronic photocopying process or in an electrostatic printing process, and a polyester resin included in the toner as a binder.

BACKGROUND ART

Generally, an electronic photocopying process or an electrostatic printing process includes the steps of: (1) forming an electrostatically-charged image or an electroconductive image (hereinafter, referred to as "electrostatic latent image") on the surface of an electrostatic recording material drum, for example, an organic photoconductor (OPC) drum; (2) electrostatically attaching a charged toner to the drum to develop and visualize the electrostatic latent image formed on the surface of the drum; (3) transferring the developed toner image to a recording medium such as paper, a recording film or the like; and (4) fixing the image transferred to the recording medium using a thermal press roller or the like.

Such an image-forming process is widely used in the fields of copiers and printers because printed material can be obtained rapidly, the control stability of the image formed on the surface of electrostatic recording material drum is excellent, and an image-forming apparatus can be easily handled.

In the step of developing the electrostatic latent image, the toners used in dry development are classified into one-component toners, two-component toners, and the like. The two-component toner includes a magnetic body for developing and transferring the electrostatic latent image formed on the drum together with a binder resin, a colorant, a charge adjuster, and other additives, and is prepared in the form of particles by melting, kneading, dispersing, finely pulverizing and classifying these toner components. The binder resin, which is the main component of the toner, must have excellent colorant dispersibility, attachability, non-offset ability, storage stability, and other electrical properties as well as excellent transparency, and must form a clear image even when a small amount of a colorant is used. Further, preferably, the binder resin must have a wide color tone range, be able to improve the image quality of copies or prints, and must be environmentally friendly.

Conventionally, a polystyrene resin, a styrene acrylate resin, an epoxy resin, a polyamide resin or the like have been used as the binder resin. Recently, polyester resins having excellent attachability and transparency have been increasingly used. However, currently, raw materials of many products including the toner are being prepared from fossil resources such as petroleum and the like. Therefore, in order to prevent the depletion of the fossil resources, it is very important to reduce the use of fossil resources. In particular, a raw material of most of the toner resin, which is 70% or more of the toner, is petroleum, thereby causing the problem of petroleum resources becoming depleted and the problem of global warming attributable to the large consumption of petroleum resources and the discharge of carbon dioxide into the atmosphere. When a plant-derived resin growing using carbon dioxide in the atmosphere is used as the toner resin, it is possible to solve both the problem of global warming and the problem of the depletion of petroleum resources because carbon dioxide is recycled by the system itself. Particularly, biomass obtained from plant-derived polymers is receiving considerable attention.

Biomass is referred to as "biological organisms" including microbes, plants performing photosynthesis using solar energy, fungi, and animals. Further, biomass resources include: starch-based resources including cereals and potatoes; cellulose-based resources including agrofishery products such as herbs, rice straws, chaffs, etc.; environmental circulation resources derived glucidic plants such as sugarcane, sugar beet, etc.; and protein-based resources including excretions of cattle, corpses of cattle, microorganisms, and fungi. Biomass resources also include organic waste, such as paper, residue of food, etc.

Such biomass can be practically used as a biological resource, which can become an energy source or various synthetic raw materials, by combining biological technologies with chemical technologies. The best advantage of biomass is that it can be reproduced. That is, differently from other fossil fuels, biomass does not become depleted, and is environment-friendly because carbon dioxide discharged to the atmosphere by combustion is obtained from the atmosphere for several years by the growth of animals, plants and microbes and thus the amount of carbon dioxide in the atmosphere does not increase. Therefore, biomass can replace conventional petrochemical products.

In order to solve the above-mentioned problem, several technologies that use biomass as the raw material of a toner resin have been proposed. For example, Japanese Unexamined Patent Publication Nos. 2009-75544, 2008-250171, 2001-166537, 1997-274335, 1994-308765 and 1994-200250 disclose technologies of using a polylactic acid resin as a toner resin. However, these technologies are problematic in that, when a polylactic acid resin is directly or partially used, it is difficult for the polylactic acid resin to serve as a thermoplastic resin in an attaching process because the ester bond concentration of the polylactic acid resin is higher than that of general polyester resin. Further, these technologies are problematic in that the toner made in this way becomes very hard, so that the toner cannot be sufficiently grinded, and its production rate is low. Furthermore, these technologies are problematic in that a large amount of fine powder is produced by the mechanical shock attributable to being agitated in a developer, thus causing offset and aggravating image degradation.

Meanwhile, the molecular weight of polylactic acid cannot be easily controlled because it uses only carbon atoms and has an ester bond, so that it is difficult to obtain the physical properties required of a toner that uses only polylactic acid. Further, polylactic acid cannot sufficiently keep up with an image forming apparatus at the time of forming a black image, thus causing fusing defects. Furthermore, polylactic acid is problematic in that its long-term storage stability gets worse in order to provide good biodegradability to toner. That is, when a toner made of polylactic acid is left for a long period of time under the conditions of high temperature and high humidity, the toner is hydrolyzed, and thus the toner cannot be used. Further, when prints are left for a long period of time while overlapping with each other, the prints may become attached to each other because of softened toner.

In order to solve the above problems, conventionally, methods of providing the physical properties and thermal characteristics required of a toner by mixing polylactic acid with other resins have been used. However, since the compatibility and dispersibility of o polylactic acid to a polyester resin and a styrene-acrylate copolymer generally used in the toner are very poor, it is very difficult to prepare a toner using a mixture of polylactic acid and other resins. Further, International Patent Application No. PCT/US2006/010136 discloses a toner resin using isosorbide and dimer acid which are plant-derived environmental circulation polymerization raw materials. However, since this toner resin is expensive, it is difficult for this toner to be commercially used, and it is difficult to increase the amount of biomass in the toner.

Generally, a polyester resin, which is used as a binder resin in toner, includes bisphenol-A or a derivative thereof as an alcohol component. However, since bisphenol-A is a compound harmful to the environment, there have been attempts to develop a polyester resin which does not include bisphenol-A or a derivative thereof, which has excellent offset resistance, low-temperature attachability, sharp melt properties, blocking resistance, electrostatic characteristics, grindability, storage stability, transparency and the like and which can form a good developed image even after being left for a long period of time.

Germanium-based catalysts, antimony-based catalysts, tin-based catalysts and the like have been used to manufacture a polyester resin for toner. However, these catalysts are problematic in that they are not environmentally preferable because they are used in an excess amount due to low activity, and in that they deteriorate the transparency of a polyester resin because they have their own coloration characteristics (for example, antimony-based catalysts exhibit gray coloration). Therefore, attempts are being made to improve the reactivity and transparency of a polyester resin using titanium-based catalysts such as tetraethyl titanate, acetyltripropyl titanate, tetrapropyl titanate, tetrabutyl titanate, polybutyl titanate, ethylacetoacetic ester titanate, isostearyl titanate, titanium dioxide, a $TiO_2/SiO_2$ coprecipitant, a $TiO_2/ZrO_2$ coprecipitant, and the like.

DISCLOSURE

Technical Problem

Accordingly, the present invention has been devised to solve the above-mentioned problems, and an object of the present invention is to provide a polyester resin for toner, which includes a large amount of biomass because plant-derived environment circulation polymerization raw material is used, which does not include bisphenol-A or a derivative thereof, and which is environment-friendly because a heavy metal catalyst, such as tin, antimony or the like, may not be used.

Another object of the present invention is to provide a toner, which can be efficiently manufactured, which has excellent offset resistance and storage stability, which has excellent attachability to an electrostatic recording material or a recording medium and has high image intensity, which has excellent durability and moisture resistance, and which has improved image stability.

Technical Solution

In order to accomplish the above objects, an aspect of the present invention provides a polyester resin for toner, including: lactic acid (D or L-lactic acid) or a derivative compound thereof (D or L-lactide); and dianhydrohexitol.

Here, the polyester resin may include, based on the total amount thereof: 5 to 70 wt % of a biomass resource-derived compound including the lactic acid (D or L-lactic acid) or the derivative compound thereof (D or L-lactide), and dianhydrohexitol; 30 to 94 wt % of a petroleum resource-derived compound including an acid component and an alcohol component; and more than 0 and less than 1% of a thermal stabilizer.

Further, the biomass resource-derived compound may include lactic acid (D or L-lactic acid) or a derivative compound thereof (D or L-lactide), dianhydrohexitol, aliphatic diol, aliphatic acid or aliphatic alkyl ester, and glycerin.

Further, the biomass resource-derived compound may include, based on the total amount of the polyester resin, 0.5 to 50 wt % of lactic acid (D or L-lactic acid) or a derivative compound thereof (D or L-lactide), 0.5 to 30 wt % of dianhydrohexitol, 0 to 10 wt % of aliphatic diol, 0 to 5 wt % of aliphatic acid or aliphatic alkyl ester, and 0.5 to 10 wt % of glycerin.

Further, the polyester resin may further include a styrene resin or a styrene-acrylate resin.

Further, the polyester resin may have a softening temperature of 125 to 190° C., an acid value of 1 to 30 KOH mg/g and a glass transition temperature (Tg) of 58 to 75° C.

Another aspect of the present invention provides a toner including the polyester resin.

Still another aspect of the present invention provides a method of preparing a polyester resin for toner, including the steps of (a) performing an esterification reaction or an ester exchange reaction using reactants in the presence of a titanium-based catalyst, the reactants including a biomass resource-derived compound including 0.5 to 50 wt % of lactic acid (D or L-lactic acid) or a derivative compound thereof (D or L-lactide), 0.5 to 30 wt % of dianhydrohexitol, 0 to 10 wt % of aliphatic diol, 0 to 5 wt % of aliphatic acid or aliphatic alkyl ester, and 0.5 to 10 wt % of glycerin; and 30 to 94 wt % of a petroleum resource-derived compound including an acid component and an alcohol component; and (b) polycondensing the reactants, wherein at least one of the reactions is performed in the presence of more than 0 and less than 1% of a thermal stabilizer.

Advantageous Effects

The polyester resin according to the present invention includes lactic acid (D or L-lactic acid) or lactide (D or L-lactide) which is a derivative compound thereof, and dianhydrohexitol.

The polyester resin, which is a binder that can manufacture an environment-friendly toner, does not include bisphenol-A or a derivative thereof, and does not use a heavy metal catalyst such as tin, antimony or the like, and thus it is environmentally beneficial. Further, the toner manufactured using the polyester resin according to the present invention has excellent storage stability, a wide fusing temperature range and high image intensity, and can be manufactured at low cost.

BEST MODE

The polyester resin for toner according to the present invention includes: lactic acid (D or L-lactic acid) or lactide a derivative compound thereof (D or L-lactide); and dianhydrohexitol.

The biomass-derived polymerization raw material is included in an amount of 5 to 70 wt %, preferably 20 to 60 wt %, and more preferably 30 to 50 wt %, based on the total amount of the polyester resin. When the amount of the biomass-derived polymerization raw material is less than 5 wt %, the effect of using the biomass-derived polymerization raw material is slight. Further, when the amount thereof is more than 70 wt %, the economic efficiency of a toner cannot be ensured, and the basic physical properties of a toner, such as offset resistance, attachability, storage stability, image intensity, durability, moisture resistance and the like, become poor.

The biomass-derived polymerization raw material includes lactic acid (D or L-lactic acid) or a derivative compound thereof (D or L-lactide). The lactic acid (D or L-lactic acid) or the lactide (D or L-lactide) has both acid properties and alcohol properties, and may be used in an amount of 0.5 to 50 wt %, preferably 10 to 40 wt %, and preferably 20 to 30 wt %, based on the total amount of the polyester resin.

The lactic acid (D or L-lactic acid) or the lactide (D or L-lactide) has price competitiveness to a petroleum-derived polymerization raw material. Therefore, the maximum amount of the lactic acid (D or L-lactic acid) or the lactide (D or L-lactide) may be used so long as it does not influence the physical properties of the toner. When the amount of the lactic acid (D or L-lactic acid) or the lactide (D or L-lactide) is more than 50 wt %, the content of the ester (a polar group) in the polyester resin comparatively increases, and thus the moisture content of the polyester resin also increases under the conditions of high temperature and high humidity.

Therefore, when a toner cartridge is left under the conditions of high temperature and high humidity, an image is good at the beginning of printing, but, as printing proceeds, the moisture content in the toner increases, so the electrostatic characteristics of toner deteriorate, and thus it is easy for an image to become poor. It is preferred that the lactic acid (D or L-lactic acid) or the lactide (D or L-lactide) be introduced in the early stage of a polymerization reaction to be included in the polyester resin in the form of a random polymer.

When the lactic acid (D or L-lactic acid) or the lactide (D or L-lactide) is introduced in the last stage of a polymerization reaction or is introduced in the form of an oligomer or a polymer, there is a problem in that it is blocked in the polyester resin, so that toner becomes hard due to the peculiar crystallinity of polylactic acid, thus deteriorating grindability and reducing productivity. Further, there are problems in that the thermoplasticity of the polyester resin is lowered due to its high melting point and in that the long-term storage stability of the polyester resin is decreased because it has biodegradability.

Aliphatic acid or an alkyl ester thereof may be used as the acid component of the biomass-derived polymerization raw material. Particularly, nowadays, biodiesel, which is an environmentally friendly fuel, is receiving considerably more attention than petroleum resource-derived fossil fuels. Biodiesel includes aliphatic methyl esters of 14 to 24 carbon atoms as major components. The content of each component in biodiesel varies depending on the kind of oil (soybean oil, rapeseed oil, palm oil, etc.) which is used as the raw materials of the biodiesel. When palmitic acid, which is a saturated aliphatic acid, includes a large amount of methyl ester, the palmitic acid influences the low-temperature fluidity of biodiesel, so that it is not proper for biodiesel to be used as fuel for vehicles in winter.

If necessary, in order to improve the low-temperature fluidity of biodiesel, aliphatic methyl esters may be removed from biodiesel, and the removed aliphatic methyl esters may be used as a byproduct. Among the aliphatic methyl esters, when palmitic methyl ester is applied to a toner resin, resources can be utilized in an environmentally friendly manner suitable to the environment, byproducts can be recycled in light of economic efficiency, and the melting characteristics of toner can be improved, thus obtaining excellent attachability. However, aliphatic methyl esters are limited to palmitic methyl ester, and all of the aliphatic methyl esters of 14 to 24 carbon atoms can be used in biodiesel.

Aliphatic acid or aliphatic alkyl ester may be used in an amount of 0 to 5 wt %, and preferably 2 to 5 wt %, based on the total amount of the polyester resin. When the amount thereof is more than 5 wt %, there is a problem in that the glass transition temperature (Tg) of the polyester resin becomes low, thus deteriorating the storage stability of the polyester resin. Further, there is a problem in that the degree of polymerization of the polyester resin cannot be made equal to the target value due to a monovalent acid component.

1,4-3,6-dianhydrohexitol may be used as the alcohol component of the biomass-derived polymerization raw material. Here, D-sorbitol, D-mannitol and D-iditol, which are derived from starch, are condensed in the presence of an acid catalyst to be formed into annular alcohol components, such as isosorbide, isomannide, and isoidide, respectively.

When these annular alcohol components are applied to the polyester resin, the glass transition temperature (Tg) of the polyester resin can become high.

The 1,4-3,6-dianhydrohexitol can solve the problem of the drop of the glass transition temperature (Tg) of the polyester resin attributable to the use of a large amount of the biomass-derived polymerization raw material. The 1,4-3,6-dianhydrohexitol may be used in an amount of 0.5 to 30 wt %, and preferably 1 to 20 wt %. When the amount thereof is more than 30 wt %, there is a problem in that economic efficiency becomes low because it is expensive. Further, there is a problem in that the glass transition temperature (Tg) of the polyester resin excessively rises, so that the softening temperature of toner also rises, and thus good attachability cannot be obtained.

Aliphatic diols may be used as the alcohol component of the biomass-derived polymerization raw material. Aliphatic diols are prepared by fermenting sugar, and may include 1,3-propanediol, 1,4-butanediol and the like, which are applied to the aliphatic diol component of a toner resin. Aliphatic diols function to increase the production yield of the polyester resin by increasing the polymerization rate thereof, and function to improve the attachability of the polyester resin by lowering the melting viscosity thereof because they serves as soft-segments in the polyester resin.

This aliphatic diol may be used in an amount of 0 to 10 wt %, and preferably 0.1 to 5 wt %, based on the total amount of the polyester resin. In addition to the aliphatic diol, glycerin, which is a byproduct remaining after producing biodiesel from biomass plant oils (palm oil, soybean oil, castor oil, sunflower oil, rapeseed oil, etc.), may be used as the alcohol component of the biomass-derived polymerization raw material. The purity of crude glycerin is generally 70-80%. In order to use crude glycerin as the biomass-derived polymerization raw material, it is preferred that the crude glycerin be refined by fractional distillation to have a purity of 90% or more. Glycerin serves to impart the polyester resin with aggregability while increasing the glass transition temperature (Tg) thereof and to improve the storage stability of toner. The amount of glycerin (polyvalent alcohol) may be 0.5 to 10 wt %, and preferably 2 to 5 wt %, based on the total amount of alcohol components. When the amount of glycerin (polyvalent alcohol) is less than 0.5 wt %, molecular weight distribution is narrow, thus narrowing the attaching temperature range of toner. Further, when the amount thereof is more than 10 wt %, a polyester resin may form a gel during a process of preparing a polyester resin, and thus it is difficult to obtain a desired polyester resin.

Petroleum resource-derived acid components and alcohol components may also be used as long as other components excluding the biomass-derived polymerization raw material components have physical properties allowing a polyester resin to be used as a binder for toner. The acid components may include aromatic dibasic acid components, cycloaliphatic dibasic acid components, aliphatic dibasic acids, alkyl esters and/or acid anhydrides thereof, and polyhydric acids (trihydric acids, tetrahydric acids, etc.). Further, the alcohol components may include cycloaliphatic diols and aliphatic diols.

In particular, the aromatic dibasic acid components may include aromatic dibasic acids, and alkyl esters and acid anhydrides thereof, which are generally used to prepare a polyester resin. Typical examples of the aromatic dibasic acids may include terephthalic acid, isophthalic acid, sodium 5-sulfoisophthalate, and the like. Examples of alkyl esters of the aromatic dibasic acids may include dimethyl terephthalate, dimethyl isophthalate, diethyl terephthalate, diethyl isophthalate, dibutyl terephthalate, dibutyl isophthalate, sodium dimethyl 5-sulfoisophthalate, and the like.

The aromatic dibasic acids and alkyl esters thereof may be used independently or in a combination of two or more. Since the aromatic dibasic acid component includes a benzene ring having high hydrophobicity, it can improve the moisture resistance of toner, and increase the glass transition temperature (hereinafter, referred to as "Tg") of the obtained polyester resin, thus improving the storage stability of toner.

The aromatic dibasic acid component may be used in an amount of 20 to 70 wt %, preferably 25 to 50 wt %, and preferably 30 to 40 wt %, based on the total amount of the polyester resin. In particular, the terephthalic acid components improve the toughness of the polyester resin and increase the Tg thereof, and the isophthalic acid components increase reactivity of reactants. Therefore, the usage rates thereof may be changed depending on the purpose.

As long as other components excluding the aromatic dibasic acid component have physical properties allowing a polyester resin to be used as a binder for toner, the amounts of cycloaliphatic dibasic acid components, aliphatic dibasic acids, alkyl esters and/or acid anhydrides thereof, polyhydric acids (trihydric acids, tetrahydric acids, etc.), cycloaliphatic dials and aliphatic diols may be appropriately adjusted, if necessary.

A petroleum resource-derived alcohol component constituting the polyester resin of the present invention includes cycloaliphatic diols. It is preferred that each of the cycloaliphatic diols have a cycloaliphatic group of 5 to 20 carbon atoms. Examples of the cycloaliphatic dials may include 1,4-cyclohexanediol, 1,4-cyclohexanedimethanol, and spiroglycol. More preferably, 1,4-cyclohexanedimethanol may be used. The amount of the 1,4-cyclohexanedimethanol may be 0.5 to 28 wt %, preferably 10 to 28 wt %, and more preferably 10 to 20 wt %, based on the total amount of the polyester resin.

The 1,4-cyclohexanedimethanol increases the storage modulus among the viscoelastic characteristics of the polyester resin in the range of temperatures higher than 170° C. to enable high-temperature offset, and improves the moisture resistance of toner, which is deteriorated by the introduction of hydrophilic dianhydrohexitol (isosorbide or isomannide), lactic acid or lactide, because it has lipophilicity, thus improving the image intensity of toner.

Further, the annular structure of 1,4-cyclohexanedimethanol improves the hydrolytic characteristics and thermal stability of the polyester resin, and prevents the reduction of molecular weight at the time of manufacturing toner, thus exhibiting wide attaching region characteristics. When the amount of 1,4-cyclohexanedimethanol is less than 0.5 wt %, the wettability of toner increases because the content of moisture in the polyester resin increases, and high-temperature offset characteristics cannot be obtained because viscoelastic characteristics become poor. Further, when the amount thereof is more than 28 wt %, the transparency of the polyester film becomes poor because the polyester resin becomes crystalline, and the attaching region of the polyester resin becomes poor because the softening point thereof becomes high.

In the present invention, the alcohol components exclude aromatic diols that are not environmentally preferable. Specific examples of the aromatic diols may include bisphenol-A derivatives, such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis (4-hydroxyphenyl)propane, polyoxyethylene-(6)-2,2-bis (4-hydroxyphenyl) propane, and the like. These bisphenol-A derivatives are generally used, but are not environmentally preferable.

The polyester resin of the present invention includes a commonly-used thermal stabilizer (polymerization stabilizer) as an additive. As the thermal stabilizer, commonly-used compounds may be used. Preferably, examples of the thermal stabilizer may include, but are not limited to, phosphoric acid, trimethyl phosphate, and triethyl phosphate.

The thermal stabilizer may be added in a concentration of 5 to 500 ppm, based on the total amount of the polyester resin.

The polyester resin of the present invention, similarly to general polyester resins, is prepared by the two steps of: an esterification reaction or an ester exchange reaction; and a polycondensation reaction.

The polyester resin of the present invention is prepared as follows. First, an acid component, an alcohol component, lactic acid (D or L-lactic acid) or lactide (D or L-lactide), and a thermal stabilizer are charged in a reactor and then heated so that an esterification reaction or ester exchange reaction takes place, and then a polycondensation reaction is performed. Therefore, at least one of the reactions may be performed in the presence of a thermal stabilizer.

Here, it is preferred that the molar ratio of alcohol component usage (G) to acid component usage (A) be 1.1 to 1.8.

The esterification reaction or the ester exchange reaction may be performed in the presence of a titanium-based catalyst, such as tetraethyl titanate, acetyltripropyl titanate, tetrapropyl titanate, tetrabutyl titanate, polybutyl titanate, ethylacetoacetic ester titanate, isostearyl titanate, titanium dioxide, a $TiO_2/SiO_2$ coprecipitant, a $TiO_2/ZrO_2$ coprecipitant, or the like.

Meanwhile, it is preferred that heavy metal catalysts, such as antimony-based catalysts and tin-based catalysts, not be used for environmental reasons. The esterification reaction or the ester exchange reaction may run at a reaction temperature of 230 to 260° C. under a nitrogen atmosphere while removing water or alcohol produced from reactants using a general method.

When the esterification reaction or the ester exchange reaction is completed, a polycondensation reaction is performed. This polycondensation reaction may also be performed under general polycondensation reaction conditions. For example, the polyester resin of the present invention may be prepared at a temperature of 240 to 270° C., preferably, 250° C. or less by performing the polycondensation process including the steps of (a) stirring reactants at low speed in low vacuum, (b) stirring the reactants at high speed in high vacuum, and (c) stirring the reactants at low speed while maintaining the pressure of a reactor at normal pressure.

During the polycondensation reaction, byproducts, such as glycols and the like, are removed by distillation. In the polycondensation reaction, the pressure of the high vacuum may be 100 mmHg or less, and preferably 30 mmHg or less. Such a high vacuum is effective to remove the low-boiling compounds produced from the polycondensation reaction from the reaction system.

It is preferred that the Tg of the polyester resin of the present invention be 58 to 75° C. When the Tg thereof is less than 58° C., there is a problem in that the grindability and storage stability of toner deteriorate. Further, when the Tg thereof is more than 75° C., there is a problem in that the thermoplastic characteristics of the polyester resin is insufficient, and thus the attachability of toner becomes poor It is preferred that the softening temperature of the polyester resin of the present invention be 125 to 190° C., and preferably 140 to 170° C. When the softening temperature thereof is less than 125° C., there is a problem in that the Tg of the polyester resin becomes low, and the storage stability of the toner deteriorates, thus causing offset at high temperature. Further, when the softening temperature thereof is more than 190° C., there is a problem in that the attachability of toner at low temperature deteriorates, thus causing offset.

Further, it is preferred that the acid value of the polyester resin of the present invention be 30 KOH mg/g or less, preferably 1 to 30 KOH mg/g, and more preferably 1 to 20 KOH mg/g. When the acid value thereof is more than 30 KOH mg/g, there is a problem in that the storage stability of the polyester resin in a developer becomes poor at the time of storing and carrying the polyester resin.

The polyester resin of the present invention is used as a main component of a binder resin of toner. However, if necessary, the polyester resin may be used in combination with a styrene-based resin or a styrene-acrylate-based resin.

The amount of a binder resin in the toner of the present invention may be 30 to 95 wt %, and preferably 30 to 90 wt %. When the amount of the binder resin is less than 30 wt %, there is a problem in that the offset resistance of toner deteriorates. Further when the amount thereof is more than 95 wt %, there is a problem in that the electrostatic stability of toner deteriorates.

The polyester resin of the present invention may be used in combination with a colorant or pigment. Examples of the colorant or pigment may include carbon black, nigrosine, lamp black, Sudan black SM, navel yellow, mineral fast yellow, lithol red, permanent orange 4 R, and the like.

Further, the polyester resin of the present invention may be used in combination with other components of toner, that is, general additives such as wax, a charge adjuster, magnetic powder and the like. Examples of the wax may include polyethylene, polypropylene, an ethylene-propylene copolymer, and the like. Examples of the charge adjuster may include nigrosine dyes, alkyl-containing azine dyes, basic dyes, monoazo dyes and metal complexes thereof, salicylic acid and metal complexes thereof, alkyl salicylic acid and metal complexes thereof, naphthoic acid and metal complexes thereof, and the like. Examples of the magnetic powder may include ferrite, magnetite, and the like.

The toner including the polyester resin of the present invention may be manufactured by a general method. For example, a binder resin, a colorant and other additives are kneaded at a temperature 15 to 30° C. higher than the softening temperature of the binder resin using a kneading machine such as a uniaxial extruder, a biaxial extruder, a mixer or the like, and then the kneaded mixture was grinded to manufacture particulate toner. The average particle size of the manufactured toner may be 5 to 10 μm, preferably 7 to 9 μm, and more preferably 5 μm or less. It is most preferred that the toner include particles having a size of 5 μm or less in an amount of 3 wt % or less.

In addition to the above general method, the toner including the polyester resin of the present invention may be manufactured by a chemical method. The chemically produced toner (CPT) can be used as a binder. The method of manufacturing a toner using a chemical method is as follows. That is, a solution, in which a previously polymerized resin is dissolved in a solvent, is dispersed in an aqueous medium in the present of a surfactant, a dispersant such as a water-soluble resin, and a dispersion stabilizer such as inorganic particles, resin particles or the like to form a suspension or emulsion, and then the suspension or emulsion is heated and decompressed to remove the solvent, thereby obtaining uniform toner.

Mode for Invention

Hereinafter, the present invention will be described in more detail with reference to the following Examples and Comparative Examples. These Examples are set forth to illustrate the present invention, and the scope of the present invention is not limited thereto. The performance evaluation methods used in the following Examples and Comparative Examples are as follows.

(1) Polymerization reaction product: when a polymerization reaction is run under the same polycondensation conditions, the case of the reaction product not being able to come out of a reactor, that is, it has gelled due to a rapid viscosity increase, is defined as "poor"; the case of the polymerization reaction time exceeding 300 minutes due to excessively slow polymerization reaction speed is defined as "unreacted"; and, the case of the polymerization reaction being a normal reaction is defined as "good".

(2) Biomass content (%): the biomass content in the polyester resin was measured using a 600 Mhz nuclear magnetic resonance (NMR) spectrometer, and the contents thereof were summed.

(3) Transparency of polyester resin: a high-temperature molten polyester resin product was solidified in the form of a plate having a size of 1 cm×1 cm, annealed in an oven at 80° C. for 2 hours, and then evaluated with the naked eye according to the following criteria.

⊚: The polyester resin is noncrystalline and transparent.
○: The polyester resin is somewhat crystalline and hazy.
x: The polyester resin is crystalline and opaque.

(4) Glass transition temperature (Tg, ° C.): The glass transition temperature of each sample was measured using differential scanning calorimetry after melting and quenching the sample and then heating the sample at a rate of 10° C./min. The mid value between the base line and a tangent line adjacent an endothermic curve is represented by "Tg".

(5) Acid value (KOH mg/g): a polyester resin was dissolved in dichloroethane, cooled and then titrated by a 0.1 N KOH solution.

(6) Softening temperature (° C.): The temperature at which half of 1.5 g of a sample flows out under the conditions of a nozzle of 1.0 ϕ×10 mm (height), a load of 10 kgf and a heating rate of 6 °C./min using a fluidity tester (CFT-500D, manufactured by Shimadzu Laboratories) is referred to as the "softening temperature" in °C.

(7) Grindability: Flake melted and extruded at the time of manufacturing toner was grinded by Hosogawa jet mill, and classified by a classifier (100 AFG, 50 ATP, 50 ZPS), and simultaneously the production yield of toner per hour was evaluated as follows.

⊚: 0.4 kg/1 hour or more

○: 0.2~0.4 kg/1 hour

X: 0~0.2 kg/1 hour (8) Storage stability: 100 g of toner was put into a glass bottle, the glass bottle was sealed, the toner was left at 50° C. for 48 hours, and then the degree of agglomeration of toner particles was evaluated with the naked eye as follows:

⊚: toner particles do not agglomerate at all, and storage stability is good.

○: toner particles somewhat agglomerate, but storage stability is good.

X: toner particles remarkably agglomerate, and storage stability is poor.

(9) Minimum attaching temperature and offset temperature: when white paper is coated with toner and then passes through a heat roller coated with silicon oil at a speed of 200 mm/sec, the minimum temperature at which the heater roller maintains an attaching efficiency of 90% or more is defined as the "minimum attaching temperature", and the maximum temperature at which the heater roller maintains an attaching efficiency of 90% or more is defined as "offset temperature". The minimum attaching temperature and offset temperature of the heat roller were measured by adjusting the temperature of the heat roller from 50° C. to 230° C. The value of the offset temperature minus the minimum attaching temperature is defined as the "attaching temperature region".

(10) Evaluation of image intensity of toner: when 5000 sheets of OHP film or paper was printed using a black printer which includes a heat roller coated with Teflon, the temperature of which freely changes and which has a printing speed of 40 page/min, the image flow and image intensity (solid area image) of the $100^{th}$, $2000^{th}$ and $5000^{th}$ were measured using a Macbeth reflective concentration meter (RD918), and then evaluated according to the following criteria.

⊚: image intensity is 1.4 or more

○: image intensity is 1.2 or more x: image intensity is 1.2 or less.

Polymerization raw materials used in the following Examples and Comparative Examples are as follows.

TPA: terephthalic acid

IPA: isophthalic acid

DMS: dimethyl-5-sulfoisophthalate, sodium salt

TMA: trimellitic acid

EG: ethylene glycol 1,2-PG: 1,2-propylene glycol

CHDM: 1,4-cyclohexanedimethanol 1,3-PDO: 1,3-propane diol(aliphatic diol)

isosorbide: 1,4-3,6-dianhydrosorbitol glycerin lactide: L-lactide

C16: palmitic methyl ester

C18: stearic methyl ester

BPA-PO: polyoxypropylene-(2,3)-2,2-bis(4-hydroxyphenyl)propane catalyst: a copolymer of titanium dioxide and silicon dioxide stabilizer: trimethyl phosphate

EXAMPLES 1-6 AND COMPARATIVE EXAMPLES 1-6

A. Preparation of Polyester Resin

A 2 l (reactor provided with a stirrer and a condenser was charged with reactants (ratio of acid component and alcohol component, G/A=1.2~1.5) having components and contents given in Table 1 below and 100 ppm (based on the total weight of a polyester resin) of a $TiO_2/SiO_2$ coprecipitant as a catalyst. Subsequently, the reactor was slowly heated to 250° C., and water, which is a byproduct, was removed from the reactor, and simultaneously an esterification reaction took place.

After the water was completely discharged to the outside of the reactor, the reactants were transferred to a polycondensation reactor provided with a stirrer, a condenser and a vacuum system. A thermal stabilizer (trimethyl phosphate) was added, the reaction temperature was increased to 250° C., reaction pressure was decreased to 50 mmHg for 30 minutes, and then an excess amount of diol was discharged while running the reaction under low vacuum.

Subsequently, reaction pressure was slowly decreased to 0.1 mmHg, and a reaction was ran until a predetermined stirring torque appears, thereby preparing a polyester resin. The softening temperature, Tg and acid value of the prepared polyester were measured and are given in Table 1.

B. Manufacture of Toner 50 parts by weight of the prepared polyester resin, 45 parts by weight of magnetite as magnetic matter and colorant, 2 parts by weight of azodye-based metal complex as a charge adjuster, and 3 parts by weight of polyethylene wax were mixed by a mixer, and melted and kneaded with an extruder.

Thereafter, the mixture was finely grinded by a jet mill grinder, classified by a wind classifier, and then coated with 1 part by weight of silica and 0.2 parts by weight of titanium dioxide to obtain toner particles having a volume average particle size of 8 to 9 μm. The grindability, storage stability, minimum attaching temperature, offset generating temperature and image intensity (100 sheets, 2000 sheets and 5000 sheets) of the obtained toner particles were evaluated, and the results thereof are given in Table 1.

COMPARATIVE EXAMPLE 7

A. Preparation of Polyester Resin

A 2 l reactor provided with a stirrer and a condenser was charged with reactants (TPA, EG, CHDM and isosorbide) having components and contents given in Table 1 below and 50 ppm (based on the total weight of a polyester resin) of a $TiO_2/SiO_2$ coprecipitant as a catalyst. Subsequently, the reactor was slowly heated to 250° C., and water, which is a byproduct, was removed from the reactor, and simultaneously an esterification reaction took place.

After the water was completely discharged to the outside of the reactor, the reactants were transferred to a polycondensation reactor provided with a stirrer, a condenser and a vacuum system. A thermal stabilizer (trimethyl phosphate) was added, reaction temperature was increased to 240° C., reaction pressure was decreased to 50 mmHg for 30 minutes, and then an excess amount of diol was discharged while running the reaction under low vacuum.

Subsequently, reaction pressure was slowly decreased to 0.1 mmHg, and the reaction was conducted for 30 minutes, and then the lactide component given in Table 1 and Sn(Oct)2 as a catalyst were added in a concentration of 50 ppm based on the total weight of a polyester resin, and the reaction was ran at normal pressure for 80 minutes. Then, reaction pressure was decreased to 0.1 mmHg for 10 minutes to remove unreacted lactide component. The softening temperature, Tg and acid value of the prepared polyester were measured and are given in Table 1.

B. Manufacture of Toner

Toner was manufactured in the same manner as in Examples 1-6 and Comparative Examples 1-6.

The toner of Comparative Example 2, which is a non-BPA-based toner manufactured using 1.4-cyclohexanethmethanol instead of a bisphenol-A or a derivative thereof, can exhibit good grindability, storage stability and image intensity. This toner is environmentally friendly because no bisphenol-A and no derivatives thereof is used. However, the toner is insuffi-

TABLE 1

|  | 1 | 2 | 3 | 4 | 5 | 6 | 1 | 2 | 3 | 4 | 5 | 6 | 7 |
|---|---|---|---|---|---|---|---|---|---|---|---|---|---|
| TPA (part by weight) | 39.0 | 26.4 | 52.2 | 50.5 | 27.5 | 51.5 | 20.5 | 49.7 | 18.8 | 49.2 | 36.1 | 54.5 | 25.9 |
| IPA (part by weight) | 0 | 0 | 0 | 0 | 0 | 0 | 10.8 | 0 | 0 | 0 | 0 | 0 | 0 |
| TMA (part by weight) | 0 | 0 | 0 | 0 | 0 | 0 | 7.7 | 0.9 | 0 | 0 | 0 | 0 | 3.0 |
| EG (part by weight) | 3.8 | 3.9 | 12.7 | 3.7 | 5.3 | 0 | 12.1 | 9.7 | 5.5 | 4.8 | 3.5 | 1.3 | 2.5 |
| CHDM (part by weight) | 16.7 | 3.0 | 26.5 | 11.4 | 12.4 | 5.8 | 0 | 35.6 | 0 | 0 | 15.5 | 6.2 | 8.8 |
| 1,3-PDO (part by weight) | 0 | 0 | 0 | 0 | 0 | 8.3 | 0 | 0 | 0 | 0 | 0 | 11.4 | 0 |
| Isosorbide (part by weight) | 13.4 | 0 | 0 | 28.9 | 0 | 23.6 | 0 | 0 | 0 | 36.5 | 0 | 12.5 | 14.8 |
| Isomannide (part by weight) | 0 | 15.1 | 0 | 0 | 1.6 | 0 | 0 | 0 | 0 | 0 | 12.4 | 0 | 0 |
| Glycerin (part by weight) | 3.4 | 2.9 | 1.9 | 5.5 | 3.0 | 8.5 | 0 | 4.1 | 5.4 | 5.3 | 3.1 | 11.8 | 0 |
| Lactide (part by weight) | 23.7 | 45.9 | 6.8 | 0 | 47.8 | 2.2 | 0 | 0 | 65.4 | 0 | 21.9 | 2.4 | 45.0 |
| C16 (part by weight) | 0 | 4.4 | 0 | 0 | 0 | 0 | 0 | 0 | 4.9 | 0 | 7.4 | 0 | 0 |
| C18 (part by weight) | 0 | 0 | 0 | 0 | 2.4 | 0 | 0 | 0 | 0 | 4.2 | 0 | 0 | 0 |
| BPA-PO (part by weight) | 0 | 0 | 0 | 0 | 0 | 0 | 49.0 | 0 | 0 | 0 | 0 | 0 | 0 |
| Thermal stabilizer (ppm) | 200 | 100 | 400 | 100 | 50 | 300 | 0 | 300 | 20 | 100 | 800 | 0 | 100 |
| Polymerization reaction time (min) | 120 | 140 | 100 | 140 | 150 | 30 | 90 | 60 | 110 | 280 | 320 | 30 | 150 |
| Polymerization reaction product | good | good | good | good | good | good | good | good | good | un-reacted | un-reacted | poor | good |
| Biomass content (%) | 42 | 68 | 8 | 40 | 54 | 45 | 0 | 4 | 74 | 53 | 58 | 37 | 58 |
| Resin transparency | ⊚ | ⊚ | ⊚ | ⊚ | ⊚ | ⊚ | ⊚ | X | ○ | ⊚ | ⊚ | ⊚ | X |
| Tg (° C.) | 67 | 63 | 65 | 66 | 60 | 58 | 67 | 71 | 58 | 63 | 48 | 52 | 76 |
| Acid value (KOH mg/g) | 12 | 10 | 9 | 12 | 16 | 7 | 6 | 9 | 15 | 12 | 10 | 2 | 4 |
| Resin softening temperature (° C.) | 175 | 152 | 165 | 150 | 160 | 185 | 174 | 210 | 148 | 124 | 121 | 202 | 170 |
| Toner softening temperature (° C.) | 166 | 154 | 163 | 153 | 158 | 176 | 158 | 190 | 135 | 130 | 125 | — | 156 |
| Grindability | ⊚ | ○ | ⊚ | ⊚ | ○ | ⊚ | ○ | ○ | ○ | ⊚ | X | — | X |
| Storage stability | ⊚ | ○ | ⊚ | ○ | ○ | ○ | ⊚ | ⊚ | X | X | X | — | X |
| Minimum attaching temperature (° C.) | 150 | 130 | 140 | 130 | 130 | 160 | 140 | 180 | 120 | 110 | — | — | 160 |
| Offset generating temperature (° C.) | 200 | 180 | 190 | 180 | 180 | 210 | 180 | 200 | 150 | 120 | — | — | 170 |
| Attaching temperature region (° C.) | 50 | 50 | 50 | 60 | 50 | 50 | 40 | 20 | 30 | 10 | — | — | 10 |
| Image intensity (100 sheets) | ⊚ | ○ | ⊚ | ⊚ | ○ | ⊚ | ⊚ | ⊚ | X | ○ | — | — | X |
| Image intensity (200 sheets) | ⊚ | ○ | ⊚ | ⊚ | ○ | ⊚ | ⊚ | ⊚ | X | ○ | — | — | X |
| Image intensity (500 sheets) | ⊚ | ○ | ⊚ | ○ | ○ | ○ | ⊚ | ⊚ | X | X | — | — | X |

The toner of Comparative Example 1, which is a general toner manufactured using a bisphenol-A derivative which is an aromatic diol, can exhibit good storage stability and grindability because of its high glass transition temperature (Tg), but is not environmentally friendly because it does not include any biomass. Further, when the toner does not include a thermal stabilizer, the difference in softening temperature between the polyester resin and the extrude toner becomes 10° C., and thus the softening temperature thereof dropped more significantly as a result of pyrolysis at the time of manufacturing the toner.

ciently transparent because 1.4-cyclohexanedimethanol is used in an excess amount without using lactide and isosorbide or isomannide to increase the crystallinity of the polyester film, a good attaching region is not able to be obtained because of its high softening temperature, and it is slightly environmentally friendly because it includes biomass in an amount of 5 wt % or less based on the total amount of the polyester resin.

Since the toner of Comparative Example 3 includes lactide in an amount of more than 50 wt %, the content of ester (the polar group) in the polyester resin comparatively increases, and thus the toner may include a large amount of moisture at high temperature and high humidity. Consequently, the toner image becomes poor because the electrostatic characteristics deteriorate of the toner, and the grindability, storage stability and attaching region of the toner become poor because the glass transition temperature (Tg) of the polyester resin drops.

Each of the toners of Comparative Examples 4 to 7 includes a biomass polymerization raw material, which is a non-petroleum resource, in an amount of 5 to 70 wt % based on the total amount of the polyester resin. However, in Comparative Example 4, when the amount of isosorbide is more than 30 wt %, the polymerization reaction rate of the polyester resin decreases, so that targeted polymerization degree cannot be obtained within the desired reaction time, with the result that the glass transition temperature (Tg) of the polyester resin drops, thereby deteriorating the storage stability and attaching region of toner.

In Comparative Example 5, when the concentration of a thermal stabilizer in the polyester resin is more than 500 ppm, the polymerization reaction rate of the polyester resin decreases, and thus targeted polymerization degree cannot be obtained within the desired reaction time. Further, when the amount of aliphatic methyl ester is more than 5 wt %, the glass transition temperature (Tg) of the polyester resin drops, so that the polyester resin is fused and adhered by frictional heat, with the result that it is impossible to grind the polyester resin, and thus toner cannot be manufactured.

In Comparative Example 6, when the amount of glycerin is more than 10 wt %, the polymerization reaction rate of the polyester resin excessively increases, so that the polyester resin gels, with the result that it is not easy to grind the gelled polyester resin, and thus toner cannot be manufactured. Further, when the amount of 1,3-propanediol is more than 10 wt %, there is a problem in that the glass transition temperature (Tg) of the polyester resin drops.

In Comparative Example 7, when a polymerization raw material having a predetermined polymerization degree (softening temperature: 120 to 140° C.) is obtained and then additional polymerization is conducted using lactide in the final stage of polymerization or is conducted using a polylactic acid oligomer in the final stage thereof, there are problems in that polylactic acid is blocked in the polyester resin, so that toner become very hard due to the peculiar crystallinity of polylactic acid, thereby deteriorating grindability and decreasing productivity, in that the characteristics of thermoplastic resin are deteriorated due to high thermal fusion temperature characteristics, and in that long-term storage stability is deteriorated because polylactic acid has biodegradability. Therefore, it is preferred that lactic acid (D or L-lactic acid) or a derivative compound thereof (D or L-lactide) be included in the form of a random polymer by introducing it at the early stage of a polymerization reaction.

The invention claimed is:

1. A toner comprising a polyester resin produced by the steps comprising:
   (a) performing an esterification reaction or an ester exchange reaction using reactants in the presence of a titanium-based catalyst, the reactants comprising a biomass resource-derived compound including 0.5 to 50 wt % of D-lactic acid or L-lactic acid or D-lactide or L-lactide, 0.5 to 30 wt % of dianhydrohexitol, 0 to 10 wt % of aliphatic diol, 0 to 5 wt % of aliphatic acid or aliphatic alkyl ester, and 0.5 to 10 wt % of glycerin; and 30 to 94 wt % of a petroleum resource-derived compound including an acid component and an alcohol component; and
   (b) polycondensing the reactants,
   wherein at least one of the reactions is performed in the presence of more than 0 and less than 1% of a thermal stabilizer.

2. The polyester resin of claim 1, further comprising a styrene resin or a styrene-acrylate resin.

3. The polyester resin of claim 1, wherein the polyester resin has a softening temperature of 125 to 190° C., an acid value of 1 to 30 KOH mg/g and a glass transition temperature (Tg) of 58 to 75° C.

* * * * *